United States Patent [19]

Pönisch et al.

[11] Patent Number: 4,930,425
[45] Date of Patent: Jun. 5, 1990

[54] SUSPENSION CONVEYOR WITH RESILIENTLY DEFORMABLE DRAG MATERIAL

[75] Inventors: Martin Pönisch, Zorneding; Josef Hafner; Rolf Schönenberger, both of Landsberg, all of Fed. Rep. of Germany

[73] Assignee: Veit Transpo GmbH, Landsberg/Lech, Fed. Rep. of Germany

[21] Appl. No.: 230,388

[22] Filed: Aug. 10, 1988

[30] Foreign Application Priority Data

Aug. 28, 1987 [DE] Fed. Rep. of Germany ....... 3728843

[51] Int. Cl.⁵ .................. B61B 13/00; B65G 17/32
[52] U.S. Cl. .................. 104/172.4; 198/683; 198/684
[58] Field of Search .................. 104/172.1, 172.4, 93, 104/89, 240, 137, 230; 198/790, 683, 684

[56] References Cited

U.S. PATENT DOCUMENTS

| | | |
|---|---|---|
| 1,949,691 | 3/1934 | Neher et al. .................. 198/683 |
| 3,296,979 | 1/1967 | Babson .................. 104/172.1 |
| 4,074,805 | 2/1978 | Bodewes .................. 198/790 |
| 4,458,809 | 7/1984 | White et al. .................. 198/790 |
| 4,464,996 | 8/1984 | Veith .................. 104/172.4 |

*Primary Examiner*—Robert J. Oberleitner
*Attorney, Agent, or Firm*—Finnegan, Henderson, Farabow, Garrett and Dunner

[57] ABSTRACT

A suspension conveyor wherein the driving force acts on casters of a carriage, comprises a drive-transmitting assembly having a resiliently deformable drag material with its rear side supported by a backup support. During drive-transmitting operation, the drag material is compressed between the carriage and the drive-transmitting member resulting in the exertion of a perpendicularly oriented force.

29 Claims, 6 Drawing Sheets

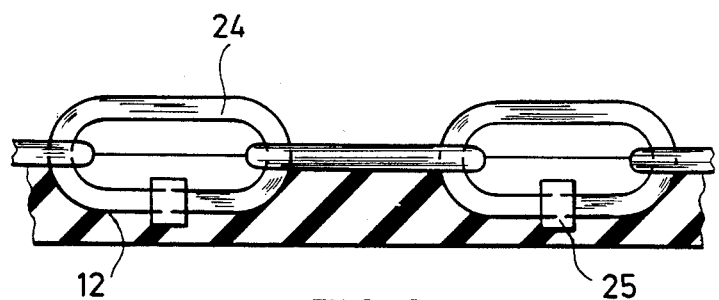
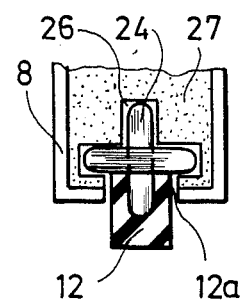
FIG.6  FIG.7
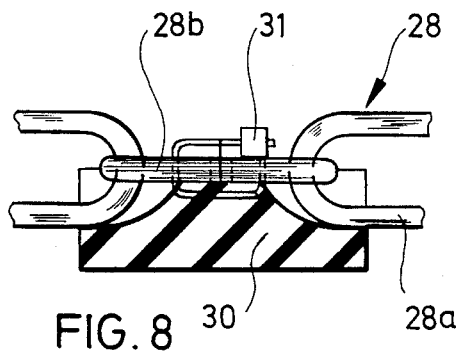
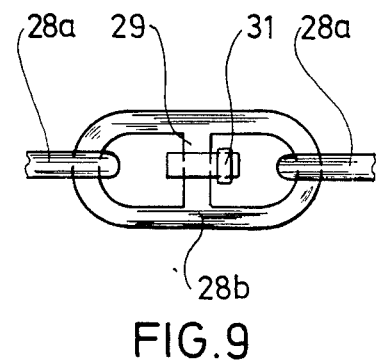
FIG.8  FIG.9
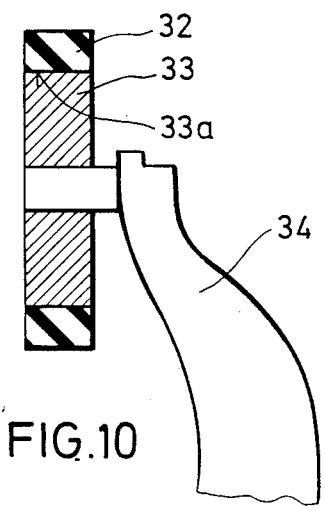
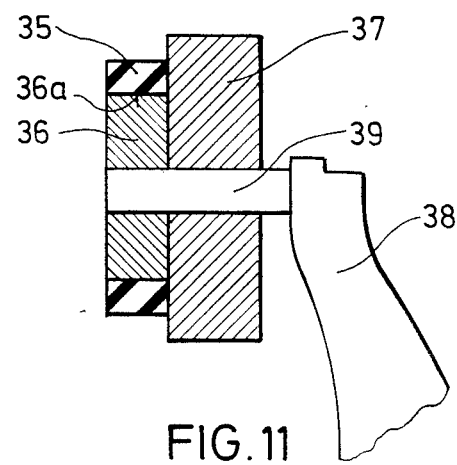
FIG.10  FIG.11

SUSPENSION CONVEYOR WITH RESILIENTLY DEFORMABLE DRAG MATERIAL

The invention relates to a suspension conveyor or and more particularly to a suspension conveyor of the type having a carriage with at least one caster for braking on a track.

A suspension conveyor of this type is disclosed in German Patent No. DE-PS 94 915. This known suspension conveyor uses a drive transmission member in the form of an endless rope received in a circumferential groove of the casters. The rope is operatively connected to a drive source and transmits its movement to the casters by frictional engagement with their grooves. Under the aspect of the construction of such a conveyor, drive transmitting means acting directly on the casters are per se advantageous, because there is considerably less danger of collision between the drive transmission means and the goods to be conveyed, as compared to a laterally disposed drive transmission means or transmission of the driving force by chains connected to the carriages below the conveyor tracks. In the case of frictional drive transmission to the casters there is always the problem, however, that the friction required for driving the casters also acts to brake the casters. The known rope drive transmission system is thus scarcely capable of causing the casters to move at a constant speed along rising or declining track sections. In addition, the grooves of the casters have to be very carefully machined so as to avoid gripping of the rope or excessive wear. There are difficulties, moreover, with regard to uniformly transmitting the vertical forces required for transmitting the driving force to all casters at all times and locations.

It is therefore an object of the invention to provide a suspension conveyor of the type defined above, which should be of simple and economical construction and reliable in its conveying performance.

The construction of the drive transmission means according to the invention with the resiliently deformable drag material is capable in a structurally simple manner of achieving a reliable conveying performance along horizontal track sections as well as along rising and declining track sections with an angle of inclination of up to 30°. The resilient deformation of the drag material results in the exertion of a vertical force capable in cooperation with the friction coefficient of the drag material of applying a rotary force to the caster, causing it to roll along the track. Any tilting of the caster is prevented by the resilient deformability of the drag material. Worn drag material can be replaced without having to disassemble the entire drive transmission assembly. In addition, carriages can be dismounted from the track in a simple manner without interrupting the transmission of the driving force to other carriages, and even without having to reduce the tension of the drive transmission element as in the case of the known rope-driven conveyor. It is also possible in a simple manner to reduce or otherwise alter the spacings between successive carriages travelling along the track. The driving force can be readily transmitted from above so as to avoid any danger of collision with the carriages and the goods suspended from the carriages when travelling along straight track sections and, even more important, when negotiating branch-off sections and switching points.

It is a further object of the present invention to provide a simple and economic construction permitting the driving force to be transmitted to the carriage in a simple manner.

It is particularly advantageous to employ a carrier in the form of a roller chain because a chain of this type transmits the driving force in a simple manner with negligible wear and acts as a good support for the drag material.

The use of a link chain as a carrier and its mounting in a guide offers the advantage of simple and economical manufacture, and permits the carrier and the drag material carried thereon to be maintained at a predetermined distance from the caster track in a structurally simple manner.

It is a further object of the invention to the free surface of the drag material to be always maintained parallel to the track, even if the carrier has to be located at a different position for reasons of the overall construction.

Embodiments of the invention shall now be described by way of example with reference to the accompanying drawings, wherein:

FIG. 1 shows a diagrammatic front view of a suspension conveyor according to a first embodiment of the invention, FIG. 2 shows a sideview of the conveyor of FIG. 1, FIG. 3 shows a diagrammatic front view of a suspension conveyor according to another embodiment of the invention, FIG. 4 shows a diagrammatic front view of another embodiment of the suspension conveyor according to the invention travelling along a declining track section, FIG. 5A to 5D show different possibilities of mounting the drag material, FIG. 6 shows an alternative construction of a carrier, FIG. 7 shows a front view of the carrier of FIG. 6 disposed in a guide, FIG. 8 shows still another construction of a carrier, FIG. 9 shows a top plan view of a detail of FIG. 8, FIG. 10 shows a diagrammatic illustration of a caster for a carriage, and FIG. 11 shows a diagrammatic illustration of another caster for a carriage.

DESCRIPTION OF THE PREFERRED EMBODIMENTS

Figure 1:
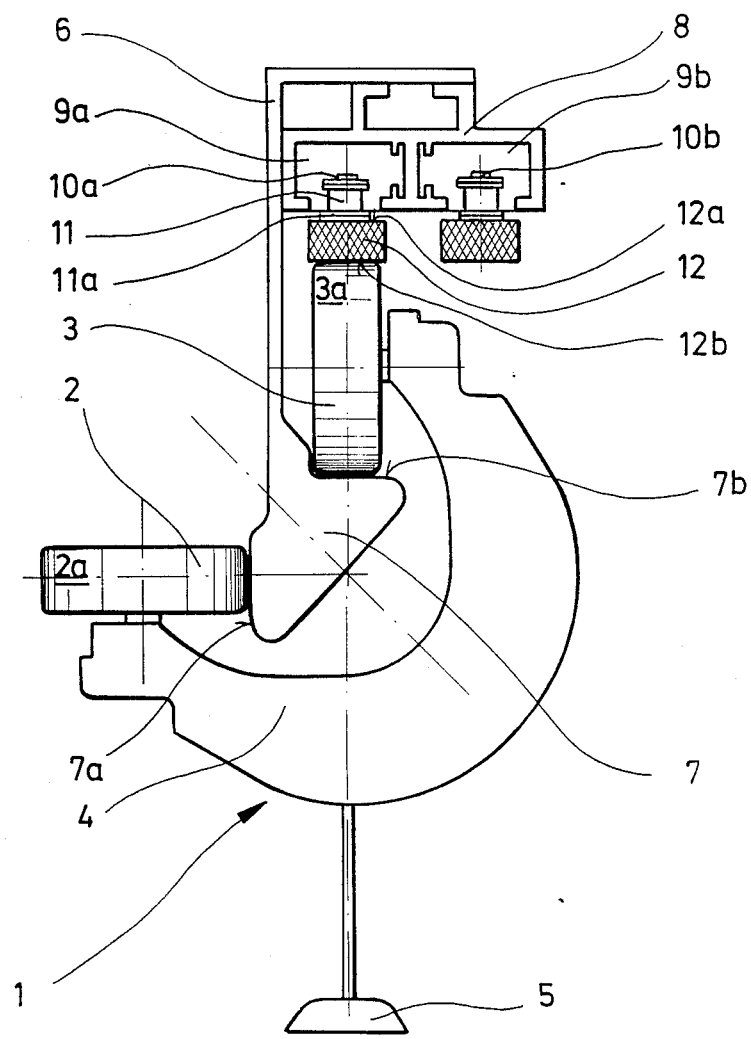
Figure 2:
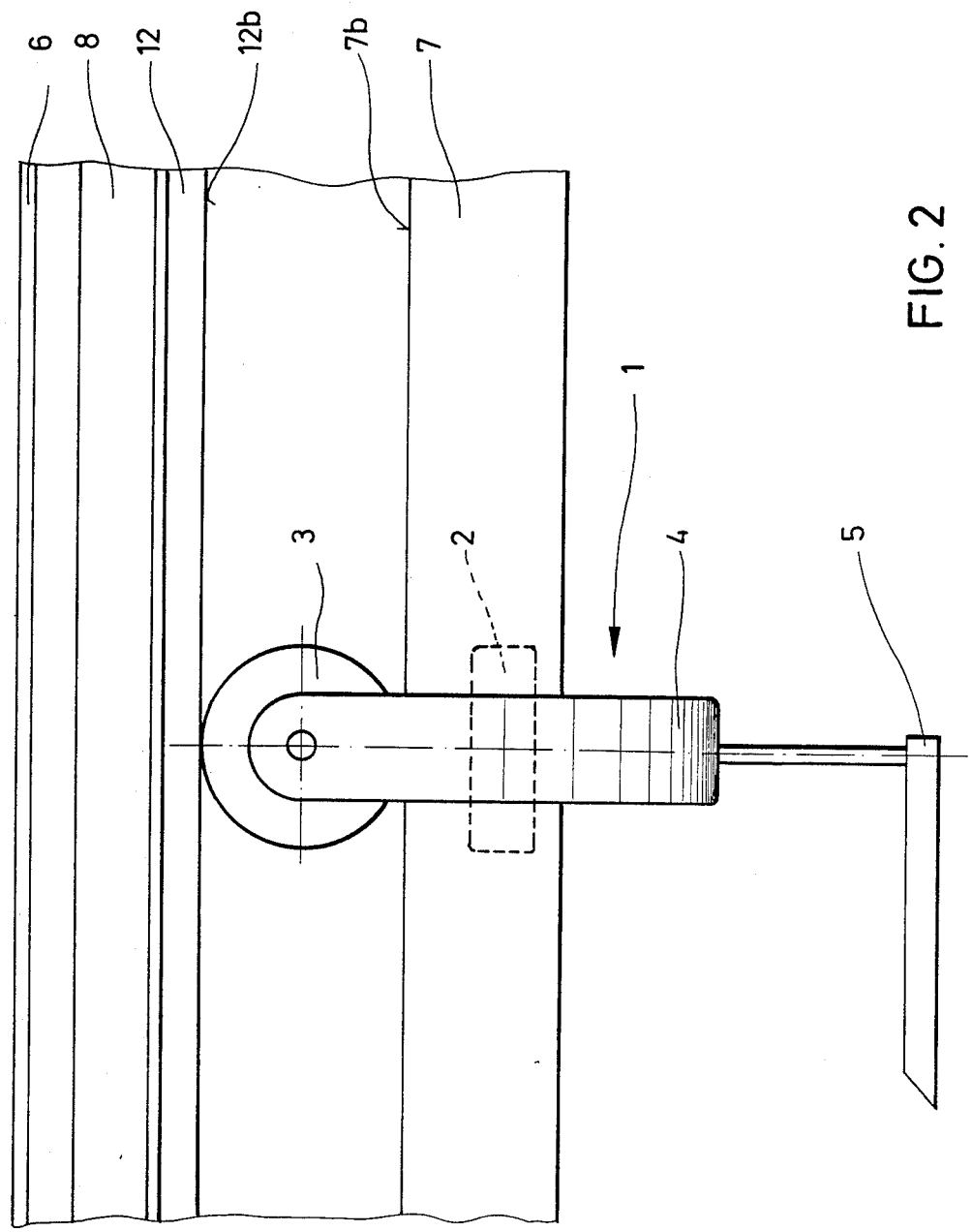

A carriage 1 shown in FIGS. 1 and 2 has two casters 2 and 3 mounted in a common yoke 4 with their axes of rotation perpendicular to one another. Yoke 4 comprises a guide (not shown) for mounting a suspension for an object to be conveyed or, as shown, a strut 5 connecting carriage 1 to another carriage so as to form a long trolley. Casters 2 and 3 are formed as discs having flat running surfaces 2a and 3a, respectively.

An elongate track rail 6 is mounted on a frame (not shown) which may for instance be suspended from the roof of a workshop. The lower end of track rail 6 is formed as a guide rail 7 having two running surfaces 7a and 7b disposed perpendicular to one another, surface 7a being vertical and surface 7b horizontal. Caster 2 is supported on running surface 7a, while caster 3 runs on running surface 7b, so that carriage 1 is in a laterally suspended position. Secured to track rail 6 above horizontal running surface 7b is a transversely extending mount 8. Two slide bearing bars 9a and 9b secured to mount 8 are formed with respective slide bearing guides 10a and 10b in the form of recesses disposed side by side in a horizontal plane and each containing a run of a roller chain 11 acting as a carrier of a drive transmitting member. Slide bearing guides 10a and 10b are shaped to conform to the shape of roller chain 11, so that roller chain 11 is prevented from dropping out of guides 10a and 10b through the open bottom side thereof. Below slide bearing guides 10a, 10b the drive transmitting member has a resiliently deformable drag material 12 which has its rear side 12a supported by a backup support formed by roller chain 11 itself or by a strip 11a secured to roller chain 11.

Suitable for use as the drag material 12 is any material having a high impact resiliency, a high degree of compressibility, a strong return force, low residual compression deformation and high wear resistance, and which has vibration dampening properties in addition to being resistant to ageing and wheathering, and particularly resistant to oils, fats, gasoline, ozone and nitrogen. A particularly suitable material is cellular polyurethane, the energy absorption properties of which can be determined by varying its density in the raw state. Other suitable drag materials are moss rubber, cellular caoutchouc, caoutchouc and other foam materials.

The drag material is employed in the form of a strip of rectangular cross-sectional shape and is secured to roller chain 11 over its full length. It is also possible, however, to secure the drag material to roller chain 11 in the form of sections of a length of for instance 0.5 m, with intervening spaces for the relief of tensions. The drag material may be secured by means of an adhesive, rivets or clips. It is also possible to secure the drag material directly to roller chain 11 by foam-bonding.

The downwards facing free surface 12b of drag material 12 extends substantially parallel to horizontal track surface 7b. The slide bearing guides 10a and 10b are positioned so that one run of drag material 12 extends perpendicularly above track surface 7b. The distance between track surface 7b and free surface 12b of drag material 12 is adjusted so that the drag material 12 is compressed between running surface 3a of caster 3 and roller chain 11 acting as the backup support. The degree of compression can be adjusted by varying the distance between free surface 12b and track surface 7b, so that the vertical force acting on caster 3 can be adjusted to desired values within certain limits.

Figure 3:
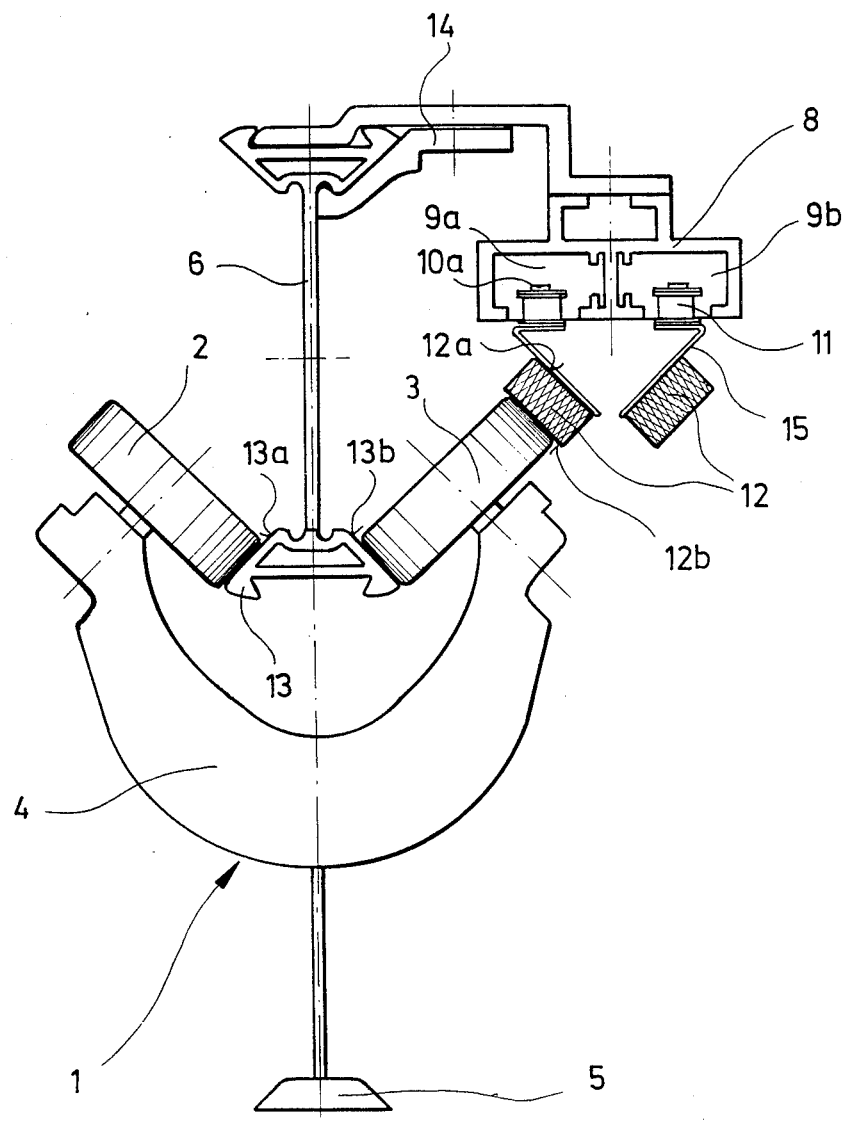

FIG. 3 shows another embodiment of a suspension conveyor, with identical or similar components being designated by the same reference numerals as above. In this embodiment carriage 1 is in a centrally suspended position. To this purpose track rail 6 carries a runner track 13 having two track surfaces 13a and 13b disposed at an angle of 45° to the vertical. In this embodiment caster 2 travels on track surface 13a, and caster 3, on track surface 13b, so that the two casters absorb equal proportions of the load suspended from carriage 1 or strut 5, respectively. Transverse mount 8 is secured to an outrigger 14 laterally projecting from track rail 6. As already described, mount 8 contains slide bearing bars 9a and 9b with their slide bearing guides 10a and 10b disposed side by side for guiding roller chain 11 acting as the carrier of the drive transmitting member. The drive transmission member additionally comprises angular brackets 15 having one of their legs secured to roller chain 11 as by rivetting. The free leg of each angular bracket 15 extends over roller chain 11 at an angle of 45° and acts as a backup support for the strip of drag material 12 having its rear side secured thereto as by rivetting or adhesive bonding. The lefthand slide bearing track 10a is disposed so that the free surface 12b of drag material 12 faces track surface 13b of runner track 13 at a distance permitting the driving force to be transmitted to caster 3.

Figure 4:
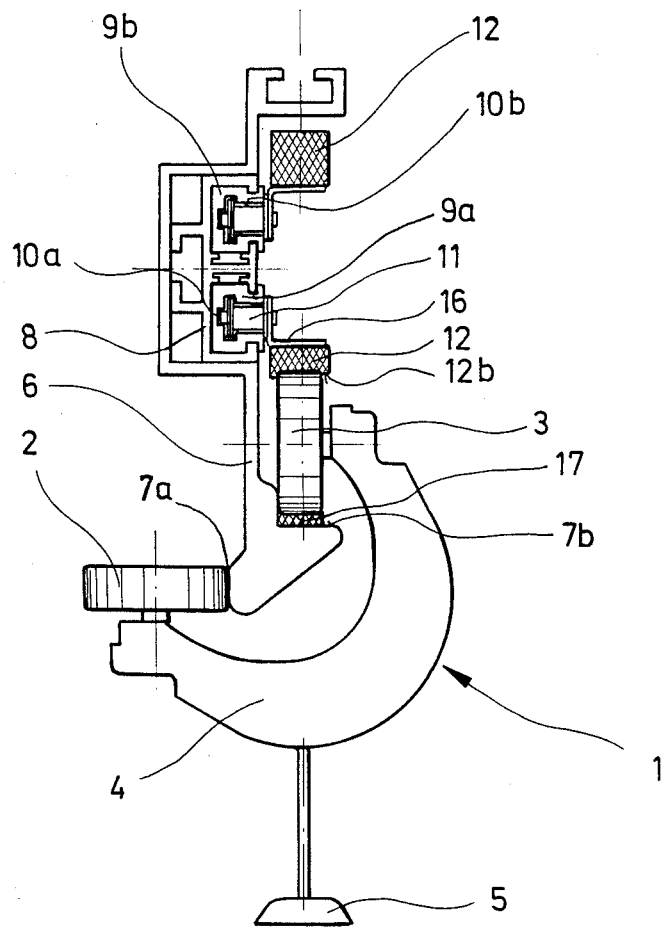

Another embodiment of a suspension conveyor is shown in FIG. 4, wherein the same reference numerals as above are again used for designating identical or similar components. As in the embodiment of FIGS. 1 and 2, carriage 1 is again in the laterally suspended position, in which caster 2 is supported on vertical track surface 7a and caster 3 runs on horizontal track surface 7b. Mount 8 is secured to track rail 6 in a vertical position, so that the two runs of roller chain 11 are guided vertically above one another. In the manner already described, mount 8 contains slide bearing bars 9a and 9b internally formed with slide bearing guides 10a and 10b, respectively. Angular brackets 16 have one of their respective legs rivetted to roller chain 11. The other free leg of angular brackets 16 extends away from roller chain 11 at an angle of 90° and acts as a backup support for drag material 12. Drag material 12 is again in the form of a strip of rectangular cross-sectional shape and has its rear side 12a secured to the free legs of brackets 16 as by rivetting or adhesive bonding. The lower slide bearing guide 10a is located at a position ensuring that the free surface 12b of the lower run of drag material 12 is accurately aligned above track surface 7b. As clearly shown in FIG. 4, the distance between free surface 12b of drag material 12 and track surface 7b is somewhat reduced by comparison to the illustration of FIGS. 1 to 3, resulting in a stronger compression of drag material 12. In this manner it is possible to cause carriage 1 to travel along inclined track sections with an angle of up to 30°. To improve the conveying performance still further, track surface 7b is provided with a friction lining 17 in the form of a thin strip. Friction lining 17 may cover all of track surface 7b or may be secured thereto only at particularly critical locations. The friction lining is preferably made of a material similar to the drag material.

The conveyance along inclined track sections with the aid of a resiliently deformable drag material can be carried out in a particularly effective manner when carriage 1 is in its laterally suspended position as shown in FIGS. 1, 2 and 4. Carriages assuming the centrally suspended position as shown in FIG. 3 are therefore preferably shifted to the laterally suspended position before entering an inclined track section. Switching devices permitting the carriages to be readily shifted from one position to the other are disclosed in P No. 36 37 287.

Figure 5A:
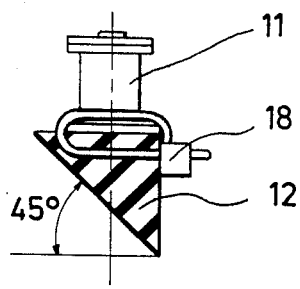

FIGS. 5A to 5D show several embodiments of the connection of drag material 12 to roller chain 11 acting as the carrier. In the embodiment of FIG. 5A, drag material 12 is in the form of a strip having the cross-sectional shape of an isoceles triangle. This embodiment may for instance be employed instead of the angular brackets 15 of FIG. 3. Drag material 12 is releasably secured to roller chain 11 by means of a cable strap 18 inserted between two rollers of roller chain 11 and through an opening in drag material 12. This connection is readily releasable when the drag material is worn and should be replaced.

Figure 5B:
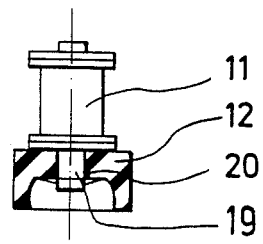

A further releasable connection is shown in FIG. 5B. In this embodiment roller chain 11 is provided with extension studs 19 projecting beyond its lower side. Drag material 12 is formed with an opening for the extension stud 19 to extend therethrough. The drag material is fixed in position by a spring washer 20 pushed onto extension bolt 19.

In this embodiment drag material 12 may be formed with a recess surrounding extension stud 19 for receiving spring washer 20 therein. Otherwise it may be compressed between spring washer 20 and roller chain 11, so that stud 19 does not contact the running surface of the caster.

Figure 5C:
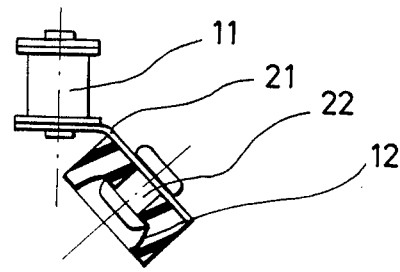
Figure 5D:
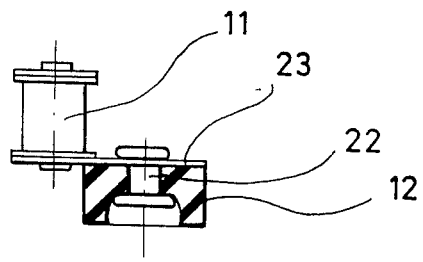

Shown in FIGS. 5C and 5D are brackets of different shape. FIG. 5C shows an angular bracket 21 having two legs enclosing an obtuse angle. In this case drag material 12 is secured by means of rivets 22 extending through drag material and received in a countersunk recess or otherwise compressing the drag material so as to not come into contact with the casters.

In the embodiment of FIG. 5D the drag material 12 is again secured by means of rivets 22 to a horizontally extending straight bracket 23. Replacement of the drag material in the embodiments of FIGS. 5C and 5D is readily accomplished by cutting off the respective rivets. It is of course also possible, however, to secure the drag material to the brackets as by means of a cable strap or a spring washer so as to be readily releasable, while the triangular drag material shown in FIG. 5A may also be secured by rivetting.

FIGS. 6 and 7 show another embodiment of the carrier in the form of a link chain 24 made in a conventional manner of steel or a plastic material. The drag material 12 is in the form of an endless strip with a slit formed in its rear side permitting the vertically oriented links of chain 24 to be received therein. The rear side of the drag material is thus mainly supported by the horizontally oriented links, and in addition by the narrow sides of the vertically oriented links of chain 24. Cable straps 25 are used to secure drag material 12 to the vertically oriented links of chain 24.

As shown in FIG. 7, link chain 24 is again guided in a recessed slide bearing guide 26 formed in a slide bearing bar 27 contained in mount 8. Slide bearing guide 26 is shaped to conform to the cross-sectional shape of link chain 24, so that the horizontally oriented links are supported from below and thus prevented from dropping out of the guide. The conforming shape of guide 26 also prevents the horizontally and vertically oriented chain links from tilting relative to one another.

FIG. 8 shows another embodiment of a drive transmitting member having a link chain 28 as a carrier. Link chain 28 is formed of conventional oval links 28a alternating with conventional oval links 28b having a central stud 29 as shown in FIG. 9. Similar to link chain 24, link chain 28 is received in a guide of the type shown in FIG. 7, so that links 28b are horizontally oriented, and links 28a extend vertically. A drag material 30 is fitted to central stud 29 in the form of a short section which is again secured thereto by means of a cable strap 31. The length of the drag material section 30 is preferably greater than that of the horizontally oriented link, with slots formed in its end portions for receiving the two adjacent vertically oriented links 28a therein. The length of the drag material section 30 is preferably slightly shorter than the combined length of a horizontally oriented link 28b and an adjacent vertically oriented link 28a so as to leave a small distance between adjacent drag material sections 30 for tension relief.

As shown in FIG. 10, it is also possible, however, to apply a drive transmitting drag material 32 directly to a caster 33 of a carriage 34, preferably by foam-bonding. The drag material 32 preferably extends completely around the periphery of caster 33, the running surface 33a of caster acting as the backup support. Depending on operational considerations, one or both casters of each carriage 34 may be provided with the drag material 32.

FIG. 11 shows another possibility of transmitting a driving force by means of a drag material 35. In this embodiment, the drag material 35 has its rear side supported by the circumferential surface 36a of a drive transmitting roller 36 connected to a caster 37 of a carriage 38 in such a manner that the driving force is transmitted from drive-transmitting roller 36 to caster 37. Drive-transmitting roller 36 is preferably rigidly connected to caster 37 and mounted for rotation in unison therewith about the same axis 39.

In the embodiments shown in FIGS. 10 and 11, the drive-transmitting member may for instance be a roller chain supported and guided in a slide bearing guide in a manner similar to the roller chains shown in FIGS. 1 to 4. The drive transmitting member may also, however, be a simple belt or a chain of different construction.

The described and illustrated embodiments may be modified for instance by exchanging details depicted in the various figures. It is further possible to mount a drag material on a carrier in a manner causing it to act on a separately provided drive-transmitting roller similar to the one shown in FIG. 11, but without a drag material thereon. In the embodiments shown, the driving force is always transmitted to only one caster. It is also possible, however, to transmit a driving force to both casters by the employ of an additional carrier or of a single carrier provided with a suitable attachment. Instead of the described chains it is also possible to employ carriers in the form of belts or the like. The cross-sectional shape of the drag material and/or the angle of the free leg of the angular brackets may also be varied in accordance with practical requirements, so that the respective carrier may be mounted and guided in the most suitable manner in consideration of the space available therefor.

We claim:

1. A suspension conveyor having a horizontally disposed first track section and a second track section extending vertically at an angle to the horizontal, comprising:
   a carriage having at least one caster for travelling on the first and second track sections;
   drive means including an elongate flexible drive transmission member, the drive means including:
   a resiliently deformable drag material having a backup supported surface attached to one of either the drive means or the carriage, and a free surface compressible a first predetermined amount upon frictional engagement with the other one of the carriage and drive means during travel over the horizontal first track section;
   said free surface and the corresponding other one of the carriage and the drive means being disposed relative to one another for increasing the compression of the drag material to an amount greater than the first predetermined amount during travel of the carriage over the second track section.

2. A suspension conveyor according to claim 1, wherein said drive transmission member comprises a flexible endless carrier on which said drag material is mounted.

3. A suspension conveyor according to claim 2 wherein said carrier is a roller chain.

4. A suspension carrier according to claim 2 wherein said carrier is a link chain.

5. A suspension conveyor according to claim 2 further comprising a flat strip connected to said carrier and attached to the supported surface of the drag material.

6. A suspension conveyor according to claim 2 wherein said drag material is directly supported by said carrier acting as said backup support.

7. A suspension conveyor comprising a carriage having at least one caster for travelling on a track, drive means including an elongate flexible drive transmission link chain and a resiliently deformable drag material mounted with its rear side supported by said link chain and having a free surface which is compressible by frictional contact with said carriage for transmitting the driving force, said link chain being received in a guide shaped to conform to the shape of said link chain for preventing unintentional tilting of the links relative to one another.

8. A suspension conveyor, comprising a carriage having at least one caster for travelling on a track, drive means including an elongate flexible drive transmission member, said drive transmission member including a flexible endless carrier on which a resiliently deformable drag material is mounted with its rear side supported by a backup support and having a free surface which is compressible by frictional contact with said carriage for transmitting the drive force, said carrier being a roller chain, and said backup support being formed as an angular bracket having one of its legs connected to said carrier, its other leg carrying said drag material and projecting angularly from said carrier.

9. A suspension conveyor, comprising a carriage having at least one caster for travelling on a track, drive means including an elongate flexible drive transmission member, and a resiliently deformable drag material, one surface of said drag material being disposed on a drive transmission roller connected to said caster, and a free surface of said drag material being compressible by frictional contact with said elongate flexible drive transmission member for transmitting the driving force.

10. A suspension conveyor, comprising a carriage having two casters for travelling on a track, said track including two running surfaces disposed perpendicular to one another, one of said casters engagable with one of said running surfaces and the other of said casters engagable with the other of said running surfaces, and drive means including an elongate flexible drive transmission member and a resiliently deformable drag material mounted having a rear side supported by said member and having a free surface compressible by frictional contact with said carriage for transmitting the driving force, said drag material having a triangular cross-sectional shape.

11. A suspension conveyor according to claims 2, 7, or 8 further comprising releasable connecting means connecting the drag material to said carrier.

12. A suspension conveyor according to claim 2, wherein said drag material is fixedly connected to said carrier by being foam-bonded thereto.

13. A suspension conveyor according to claim 2, wherein said drag material is continuous.

14. A suspension conveyor according to claims 2, 7, or 8 wherein said drag material comprises spaced sections.

15. A suspension conveyor according to claim 1, wherein the free surface of said drag material is in frictional contact with said caster.

16. A suspension conveyor according to claim 1, wherein said drag material is disposed on said carriage with its free surface in frictional contact with said elongate flexible drive transmission member.

17. A suspension conveyor according to claim 16, wherein said drag material is disposed on the track-engaging surface of a caster.

18. A suspension conveyor according to claims 1, 7 or 9 wherein said drag material has a rectangular cross-sectional shape.

19. A suspension conveyor according to claims 1, 7, 8, 9 or 10 wherein said drag material is cellular PUR.

20. A suspension conveyor according to claims, 1, 7, 9 or 10 wherein said drag material is either moss rubber cellular caoutchouc, or caoutchouc.

21. A suspension conveyor according to claims 1, 7, 9 or 10 wherein at least part of said track section is provided with a friction lining.

22. A suspension conveyor according to claim 21, wherein said friction lining is a layer of said drag material fixedly connected to said track section.

23. A suspension conveyor according to claim 1, wherein a carriage having at least two casters selectively mountable in either a centrally suspended position or a laterally suspended position, travels along said second tract section in the laterally suspended position.

24. A suspension conveyor according to claims 7, 8, 9 or 10, wherein said drag material is compressed greater on rising and declining track sections than on horizontal track sections.

25. A suspension conveyor according to claim 9 or 10, wherein said carrier is a roller chain.

26. A suspension conveyor according to claims 9 or 10, wherein said drag material is connected to said carrier by releasable connecting means.

27. A suspension conveyor according to claims 9 or 10, wherein said drag material is fixedly bonded to said carrier.

28. A suspension conveyor according to claims 9 or 10, wherein said drag material is continuous.

29. A suspension conveyor according to claims 9 or 10, wherein said drag material is in the form of spaced sections.

* * * * *